United States Patent [19]
Dishart et al.

[11] Patent Number: 5,999,134
[45] Date of Patent: Dec. 7, 1999

[54] GLASS ANTENNA SYSTEM WITH AN IMPEDANCE MATCHING NETWORK

[75] Inventors: Peter T. Dishart, Pittsburgh, Pa.; David A. Saar, Lawrenceville, N.J.

[73] Assignee: PPG Industries Ohio, Inc., Cleveland, Ohio

[21] Appl. No.: 08/769,359

[22] Filed: Dec. 19, 1996

[51] Int. Cl.$^6$ .................................................. H01Q 1/32
[52] U.S. Cl. ........................... 343/713; 343/860; 343/861
[58] Field of Search ..................................... 343/713, 861, 343/860; H01Q 1/32

[56] References Cited

U.S. PATENT DOCUMENTS

| | | | |
|---|---|---|---|
| 3,599,214 | 8/1971 | Altmayer | 343/713 |
| 3,655,545 | 4/1972 | Gillery et al. | 204/192 |
| 3,962,488 | 6/1976 | Gillery | 427/109 |
| 3,987,449 | 10/1976 | DeAngelis et al. | 343/713 |
| 4,707,700 | 11/1987 | Nagy | 343/712 |
| 4,768,037 | 8/1988 | Inaba et al. | 343/713 |
| 4,849,766 | 7/1989 | Inaba et al. | 343/713 |
| 4,898,789 | 2/1990 | Finely | 428/623 |
| 5,083,135 | 1/1992 | Nagy et al. | 343/713 |
| 5,212,492 | 5/1993 | Jesman et al. | 343/713 |
| 5,306,547 | 4/1994 | Hood et al. | 428/213 |
| 5,334,988 | 8/1994 | Murakami et al. | 343/713 |
| 5,355,144 | 10/1994 | Walton et al. | 343/713 |
| 5,416,491 | 5/1995 | Nishikawa et al. | 343/713 |
| 5,528,314 | 6/1996 | Nagy et al. | 348/713 |
| 5,564,086 | 10/1996 | Cygan et al. | 343/861 |
| 5,699,071 | 12/1997 | Urakami et al. | 343/713 |
| 5,748,155 | 5/1998 | Kadunce et al. | 343/713 |

FOREIGN PATENT DOCUMENTS

960759  1/1975  Canada.

*Primary Examiner*—Don Wong
*Assistant Examiner*—Hoang Nguyen
*Attorney, Agent, or Firm*—Kenneth J. Satchel; Andrew C. Siminerio

[57] ABSTRACT

The present invention provides a glass antenna system with improved reception, a connector of the glass antenna system and a method of producing the glass antenna system. The glass antenna system includes a glass substrate, at least one electroconductive antenna element positioned along a major surface of the substrate, wherein the antenna element provides an impedance which varies over a given frequency band, an impedance matching network secured to the glass substrate in a position such that the impedance matching network is electrically coupled to a portion of the antenna element, and means to electrically interconnect the network to a feedline of an electromagnetic energy transmitting and/or receiving unit. The impedance matching network is used to transform the impedance of the antenna element to a desired impedance. In one particular embodiment of the invention the impedance matching network is part of a connector and is formed along a first major surface of a printed circuit board. The network is electrically connected to the opposing major surface of the board which includes an electroconductive coating. The connector is secure to the glass substrate in a position such that the impedance matching network is electrically coupled to the antenna element. The impedance matching network may be a passive or active impedance matching network. The glass antenna may be incorporated into a laminated windshield wherein glass substrate is a first glass ply and further including a second glass ply secured to the first glass ply, with the antenna element positioned between the plies.

39 Claims, 4 Drawing Sheets

GLASS ANTENNA SYSTEM WITH AN IMPEDANCE MATCHING NETWORK

BACKGROUND OF THE INVENTION

1. Field of the Invention

The present invention relates to an antenna system, and in particular to a glass antenna system for a vehicle windshield having a connector with an integral impedance matching network to optimize the performance of the glass antenna.

2. Technical Considerations

In the past, the traditional motor vehicle antenna for receiving and transmitting electromagnetic signals was a mast or whip-type antenna. Recently, there has been a trend towards incorporating the antenna into the vehicle structure. For example, U.S. Pat. No. 3,987,449 to DeAngelis et al. discloses a wire antenna laminated within a vehicle windshield. U.S. Pat. No. 4,707,700 to Nagy positions an antenna within the roof structure of a vehicle. U.S. Pat. No. 5,416,491 to Nishikawa et al. forms antenna elements on a window using electro-conductive ceramic paints. U.S. Pat. Nos. 4,768,037 and 4,849,766 to Inaba et al. and 5,355,144 to Walton et al. use a transparent electroconductive coating laminated between two glass plies to form the antenna.

In designing an antenna system, attention is given to matching the impedance of the system components, and in particular matching the impedance of the radio, the antenna and the feedline between these two components. This is a critical issue for the performance in FM reception since impedance mismatch results in significant loss of signal. Further complicating the antenna system design is the fact that the impedance of the antenna component of the system may vary substantially over the FM frequency band. This means a simple impedance match, such as a single capacitor, will not address the overall performance issues for FM reception over the entire frequency band.

In a glass antenna, the impedance of the antenna is typically not well matched to the radio and the feedline. One way this issue has been addressed by antenna designers is to design the antenna to have a desired impedance, for example, as disclosed in U.S. Pat. Nos. 5,083,135 and 5,528,314 to Nagy et al. Designing the antenna to a predetermined impedance improves the antenna performance but as discussed above, the impedance generally varies over the FM band based on frequency so that the antenna design may not be optimal over the entire FM frequency band. In addition, designing the antenna to have a predetermined impedance would require each antenna to be designed specifically for the particular type of radio and feedline in the particular antenna system as well as the vehicle into which the windshield is installed.

It would be advantageous to provide a glass antenna system for a vehicle which provides improved performance, in particular for the FM frequencies, without having to redesign the antenna system based on the vehicle and/or types of components used in the system.

BRIEF DESCRIPTION OF THE INVENTION

The present invention provides a glass antenna system with improved reception. The glass antenna system includes a glass substrate, at least one electroconductive antenna element positioned along a major surface of the substrate, wherein the antenna element provides an impedance which varies over a given frequency band, an impedance matching network secured to the glass substrate in a position such that the impedance matching network is electrically coupled to a portion of the antenna element, and means to electrically interconnect the network to a feedline of an electromagnetic energy transmitting and/or receiving unit. The impedance matching network is used to transform the impedance of the antenna element to a desired impedance. In one particular embodiment of the invention, the impedance matching network is part of a connector and is formed along a first major surface of a printed circuit board. The network is electrically connected to the opposing major surface of the board which includes an electroconductive coating. The connector is secured to the glass substrate in a position such that the impedance matching network is electrically coupled to the antenna element. The impedance matching network may be a passive or active impedance matching network. The glass antenna may be incorporated into a laminated windshield wherein glass substrate is a first glass ply and further including a second glass ply secured to the first glass ply, with the antenna element positioned between the plies.

The present invention also includes a connector for connecting an antenna to a feedline of an electromagnetic energy transmitting and/or receiving unit, wherein the connector includes an impedance matching network and means to connect said connector to said feedline of said unit. In one particular embodiment of the invention, the impedance matching network is formed along a first major surface of a printed circuit board. The opposing major surface of the board includes an electrically conductive coating and the network is electrically connected to said coated side. The connector further includes means to connect said connector to said feedline of said unit.

The present invention also provides a method of manufacturing a transparent antenna system comprising the steps of positioning at least one electroconductive antenna element along a major surface of a rigid, transparent substrate, securing an impedance matching network to said substrate in a position such that said impedance matching network is electrically coupled to a portion of said antenna element, and electrically interconnecting the network to a feedline of an electromagnetic energy transmitting and/or receiving unit. The antenna element provides an impedance which varies over a given frequency band and impedance matching network transforms the impedance of the antenna element to a desired impedance.

DETAILED DESCRIPTION OF THE INVENTION

The present invention provides a glass antenna system with improved reception and a method of producing the antenna system and is disclosed in combination with an antenna system incorporated into an automotive windshield. However, it should be appreciated that the present invention may be used in other transmitting and/or receiving antenna systems where it is important to match the impedance of the system components and optimize performance over a wide frequency band, e.g. cellular phone or television antenna systems.

Figure 1:
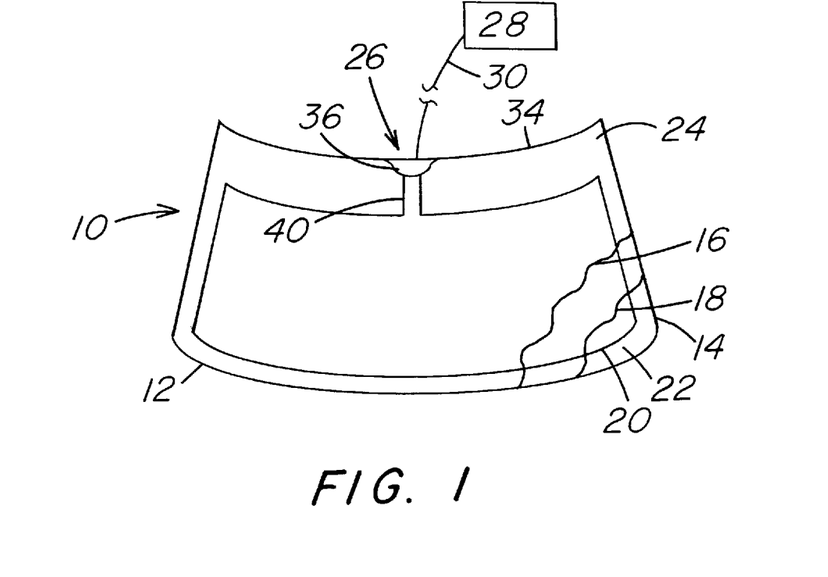
FIG. 1 is a plan view of a laminated glass antenna with a connector positioned within a notch area along an edge of the laminate, wherein the connector incorporates features of the present invention.

FIG. 1 illustrates an antenna system 10 including a laminated vehicle windshield 12 formed by outer and inner glass plies 14 and 16, respectively, which are bonded together by a thermoplastic interlayer 18, preferably polyvinyl butyral. Plies 14 and 16 may be other transparent rigid materials, for example acrylic, polycarbonate, or the windshield 12 may include a combination of different transparent, rigid materials. Windshield 12 further includes at least one antenna element 20. In the particular antenna configuration illustrated in FIG. 1, the antenna element 20 is a transparent electroconductive coating applied on surface 22 of glass ply 14 in any manner well known in the art, and generally occupies the central portion of the windshield 12. The coating may be a single or multilayered metal containing coating, for example as disclosed in U.S. Pat. Nos. 3,655,545 to Gillery et al.; 3,962,488 to Gillery; and 4,898,789 to Finley. It should be appreciated that the antenna element 20 may have a configuration different from that shown in FIG. 1. For example, antenna element 20 may be T-shaped as disclosed in U.S. Pat. No. 5,083,135 or may include multiple elements having various shapes as disclosed in U.S. Pat. No. 5,528,314. The windshield 12 may further include a decorative border (not shown) bonded to the marginal edge portion of the windshield 12. This border is typically formed from a ceramic paint applied to surface 24 of inner ply 16.

Although the antenna element 20 discussed above is a transparent coating, if the antenna element is not positioned in the major vision area of the windshield 12 or does not obstruct the windshield's main viewing area, antenna element 20 may be a nontransparent electroconductive material, for example silver-containing ceramic paint, wires, metal foil, etc. In addition, the antenna element 20 may include a combination of coating, wire and/or ceramic antenna elements.

It should be appreciated that the antenna element does not have to be secured to a major surface of a rigid ply of a transparency. More specifically, the antenna element may be incorporated into a flexible ply. For example, and without limiting the present invention, an antenna wire or electroconductive coating may be positioned on or within an interlayer 18. It is also contemplated that the antenna element may be applied to a flexible substrate, such as a polyester film (PET), which in turn is incorporated into the interlayer 18, as disclosed in U.S. Pat. No. 5,306,547 to Hood et al.

With continued reference to FIG. 1, antenna element 20 in this particular configuration is basically quadrilateral in shape and preferably spaced from the peripheral edge of the windshield 12. The exact shape and position of antenna element 20, as well as any additional antenna elements depends in part on the design of the vehicle into which the windshield 12 is installed, the angle of windshield installation, the coating resistivity, the type of signal to be transmitted or received and the desired performance of the antenna. These types of design considerations for a transparent glass antenna are discussed in U.S. Pat. Nos. 4,768,037; 4,849,766 and 5,083,135.

Figure 2:
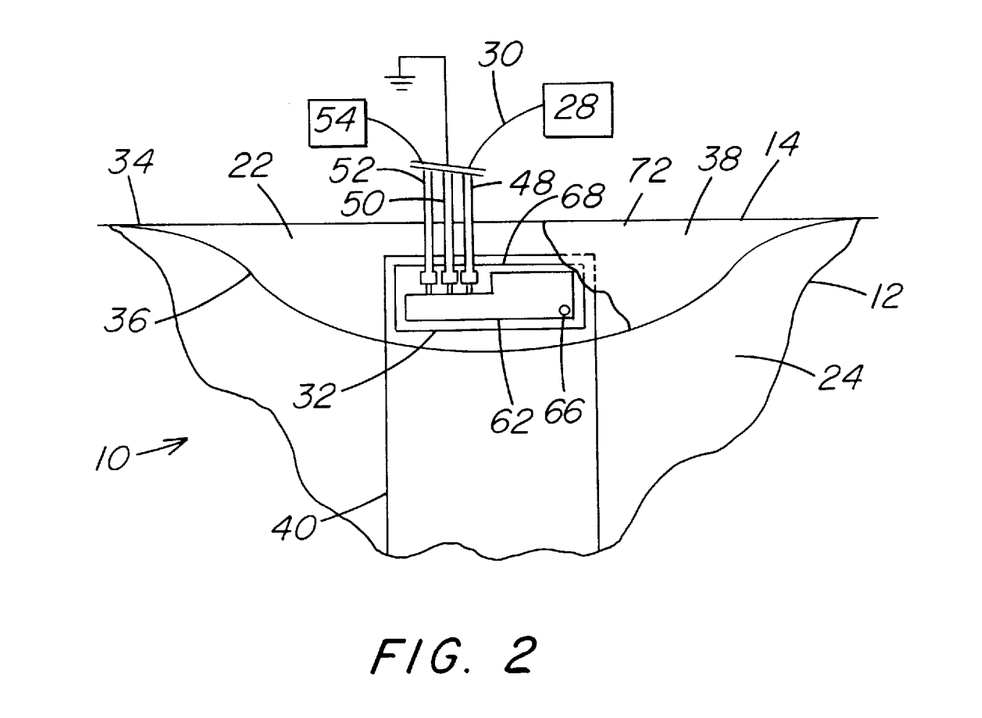
FIG. 2 is an enlarged plan view of the connection area of the antenna illustrated in FIG. 1 with a connector having an impedance matching network.
Figure 3:
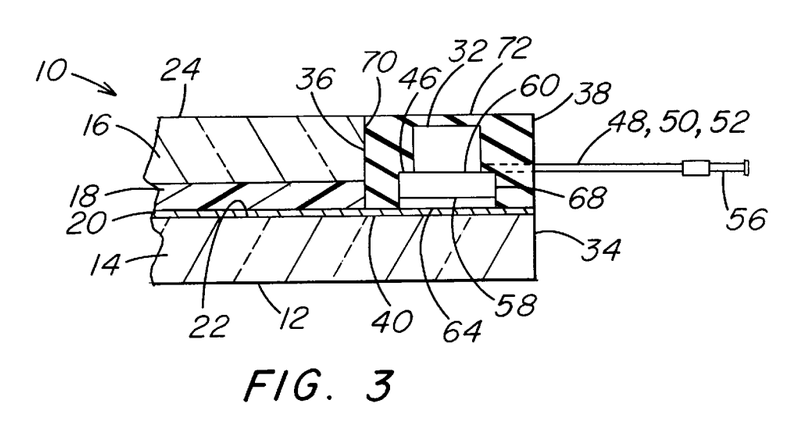
FIG. 3 is a view taken along line 3—3 of FIG. 2.

Referring to FIGS. 2 and 3, an antenna feed arrangement 26 provides a connection between the antenna element 20 and an electro-magnetic energy transmitting and/or receiving unit 28 (shown only in FIG. 1) via a feedline, e.g. a coaxial cable 30, which incorporates an impedance matching network into the antenna system 10, as will be discussed later in more detail. In a preferred embodiment of the invention, the antenna feed arrangement 26 includes a connector 32 secured to the windshield 12, as will be discussed later in more detail. Unit 28 may be a radio, cellular phone, television, global positioning system or any other type of system that uses antenna element 20 to transmit and/or receive signals. Although not required, in the particular antenna arrangement shown in FIG. 1, the connector 32 is positioned along the upper edge 34 of the windshield 12. The connection arrangement between the connector 32 and antenna element 20 of feed arrangement 26 is configured such that the connector 32 is not laminated between plies 14 and 16. In this manner, the problem of entrapped air resulting from a connector being laminated within the windshield 12 is eliminated. More specifically, a notch area 36 is cut out of the inner ply 16 along the upper edge 34 of the windshield 12, as shown in FIGS. 1 to 3. In one particular embodiment of the connector arrangement, a corresponding section of the interlayer 18 is removed from the notch area 36. Connector 32 is adhered and electrically coupled to a portion of the antenna element 20 that extends into the notch area 36. The notch area 36 is filled with a sealant material 38 to further secure the connector 32 in place and seal the notch area 36, as will be discussed later in more detail. Where the antenna and notch area configuration are such that a portion of antenna element 20 passes through the notch area 36, the connector 32 is secured directly to antenna element 20. As an alternative, the antenna feed system 26 may include an extension 40 which extends the antenna element 20 into the notch area 36 and provides an arrangement whereby the connector 32 may be electrically coupled to the antenna element 20 through extension 40. Depending on the antenna design, extension 40 may or may not be an antenna element. It should be appreciated that when the present disclosure states that the connector or impedance matching network is electrically coupled to antenna element 20, the coupling may be directly to antenna element 20 or to element 20 through extension 40 as discussed above. Although not required, the extension 40 may be made of the same material as antenna element 20. It is preferred that the antenna element 20 or extension 40 should not extend to the edge 34 of the windshield 12 at notch area 36 but rather terminate at least 1 mm from the edge 34 to ensure that the electroconductive antenna elements are completely sealed within the notch area 36 by sealant 38 to inhibit degradation of the antenna element 20 along edge 34.

As discussed earlier, it is important that the impedance of the antenna component of the antenna system match that of the other system components in order to optimize the antenna system performance. In the present invention, this optimization is accomplished by incorporating an impedance matching network into the antenna system, and in particular the network is provided in the form of a printed circuit board that is incorporated into connector 32 of the feed arrangement 26 and secured directly to the windshield 12. The impedance matching network serves to couple all of the radio frequency energy generated by the antenna and make it available to the radio. In addition, by incorporating the impedance matching network into the connector 32 that is secured to the antenna element 20 of windshield 12, there is negligible loss in the transfer of signal from the antenna to the impedance matching network.

Using an impedance matching network provides additional advantages. Because the output impedance of the antenna is manipulated by the matching network, there is more flexibility in the design of the antenna elements of the overall system. More specifically, designing the antenna to have a desired impedance, e.g. a value that closely matches that of the radio 28 and coaxial cable 30, would no longer be required since the impedance matching network will perform the same function. Furthermore, the impedance matching network will provide better matching of the impedance over the entire FM frequency band so that there will be a more efficient power transfer from the antenna element 20 to the radio 28.

Figure 4:
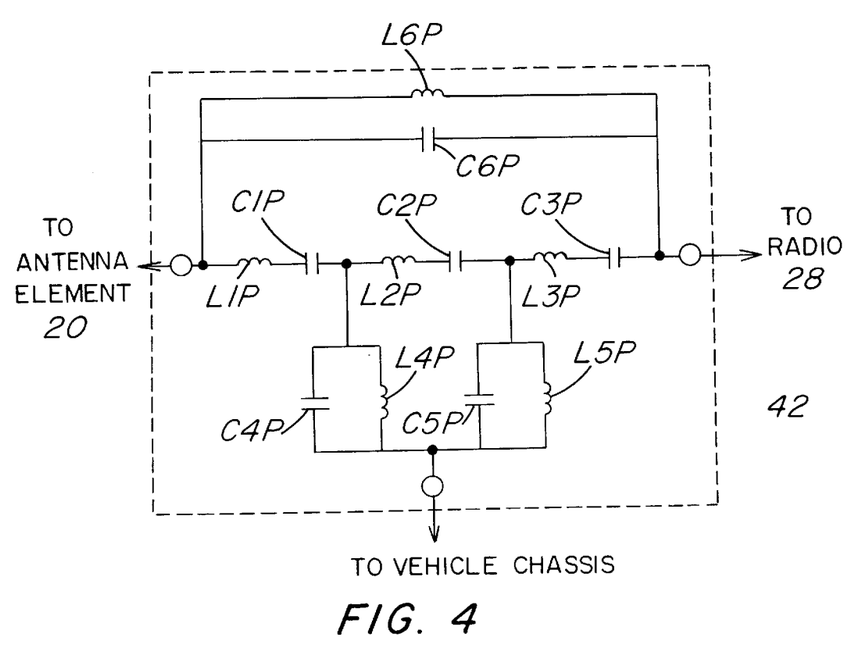
FIG. 4 is an electrical schematic of a representative passive impedance matching network.

In the present invention, the impedance matching network may be either a passive impedance matching network or an active impedance matching network. A passive impedance matching network is a circuit which uses a combination of electrical components, e.g. capacitors and inductors, to divide the FM signal into several wavelength bands and to change the impedance of each band to be closer to that of the radio 28 and coaxial cable 30. Although not limiting in the present invention, FIG. 4 illustrates a representative passive impedance matching network 42 which uses inductors L1P through L5P and capacitors C1P through C5P to form a standard double PI network for the FM signal, wherein each leg can have inductance and/or capacitance. An additional inductor L6P and capacitor C6P are used to carry the AM signal around the network 42. It should be appreciated that since the impedance of the antenna changes at different frequencies, the passive impedance matching network can only represent a compromise, although it provides a significantly better performance than an antenna system without such an impedance matching network. In addition, the electrical characteristics of the components of the passive impedance matching network 42 may vary based on the vehicle into which similarly designed antennas are installed because the impedance of the antenna system 10 is based in part on the vehicle body design. Furthermore, based on the vehicle and antenna design, some of the electrical components of the passive impedance matching network 42 of the configuration shown in FIG. 4 may not be required. An advantage in using a passive impedance matching network is that no additional power is required to operate the circuit. Table 1 illustrates an example of a passive impedance matching network 42 of the configuration shown in FIG. 4. The values of the electrical components were modeled using a computer program that takes measured antenna impedance at selected frequencies and uses an interactive process that varies the values of the components to achieve a desired match.

TABLE 1

| L1P 0 H | C1P 33 pF |
|---|---|
| L2P 62 nH | C2P 27 pF |
| L3P 0 H | C3P 10000 pF |
| L4P 0.1 H | C4P 0 F |
| L5P 0 H | C5P 62 pF |
| L6P 1000 nH | C6P 0 F |

H = Henry
F = Farad

It should be appreciated by those skilled in the art that the value selected for L4P represents that this component would not be included in this particular embodiment of the network.

Figure 5:
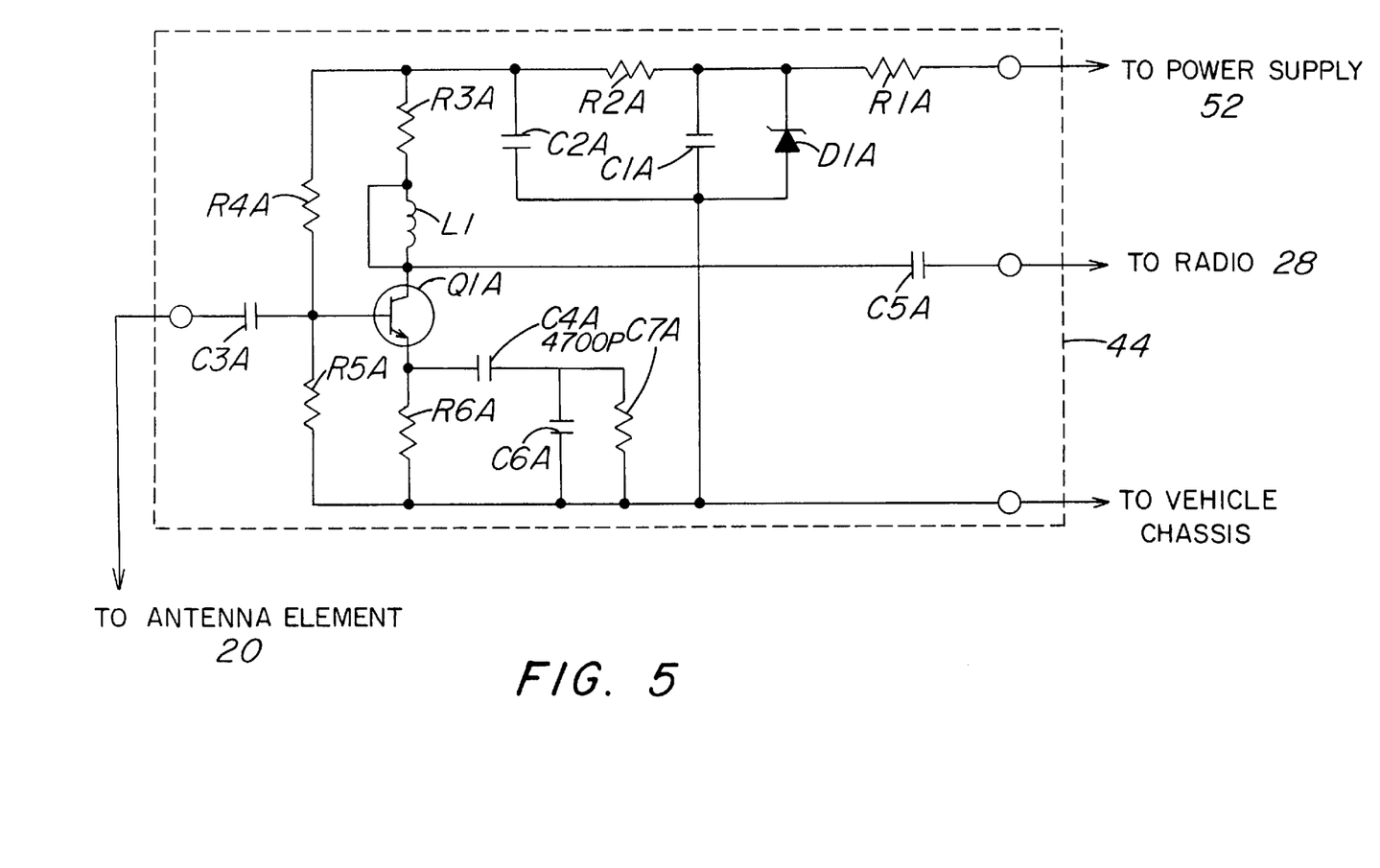
FIG. 5 is an electrical schematic of a representative active impedance matching network.

An active impedance matching network is a circuit that incorporates an amplifier with a relatively high input impedance and a controlled output impedance. The output impedance is matched to a desired value, e.g. the impedance of the radio 28, to optimize the signal transfer to the radio 28. One major difference between a passive and an active impedance matching network is that the latter requires additional power to produce the required output impedance. It is anticipated that the power required for an active matching network is about 2 mA from the 12 volt car power. In addition, rather than dividing the FM frequency band into several smaller frequency bands as discussed above with respect to the passive impedance matching network, the active impedance matching network transforms the impedance of the antenna component to a desired value, regardless of the radio frequency. Although not limiting in the present invention, FIG. 5 illustrates a representative active impedance matching network 44. The basic circuit of active matching network 44 is a standard common emitter amplifier using a low noise and a low cost RF transistor Q1A. The signal from the antenna element 20 is coupled to capacitor C3A to ensure that the bias of the transistor is not effected by any DC leakage to the electroconductive coating forming antenna element 20. The transistor bias is generated by base resistors R4A and R5A and emitter resistor R6A. The frequency response and gain are primarily determined by the capacitor C4A and resistor R7A. To increase the gain of the network at FM frequencies, the value of R7A is reduced and conversely, to reduce the gain of the network at FM frequencies, the value of R7A is increased. For a further increase in FM gain, capacitor C6A in this particular embodiment of the active network may be installed with values in the range of 10 to 220 picofarads. To increase the gain at AM frequencies, the value of C4A is increased. The network output is capacitively coupled to the radio 28 through capacitor C5A so that if the radio 28 is not capacitively coupled, it will short out the output. This also allows supplying the power required for the active impedance matching network 42 through the cable 30. Power to matching network 42 is provided through resistor R1A and zener diode D1A to protect against high peak voltages from the vehicle electrical system. Capacitor C1A provides noise filtering. Resistor R2A and capacitor C2A provide isolation at radio frequencies and resistor R3A is a transistor load. Inductor L1 may be used to provide additional gain. One advantage of using an active impedance matching network is that no change in components is required for different windshield antenna and/or vehicle designs because the output impedance is less sensitive to the antenna and vehicle design. The active impedance matching network will provide a predetermined output impedance over a wide variation in antenna component impedance. Therefore, there is more flexibility to the overall antenna system design. In addition, the active matching network may be used to improve the AM performance because of amplification of the signal, and further should provide better overall performance than the passive matching network, especially for antennas that have a wide impedance variation. Table 2 illustrates an example of an active impedance matching network 44 of the configuration shown in FIG. 5.

TABLE 2

| R1A 1000 Ω | C1A 0.1 uF |
|---|---|
| R2A 2000 Ω | C2A 1000 pF |
| R3A 330 Ω | C3A 0.01 uF |
| R4A 10000 Ω | C4A 4700 pF |
| R5A 7500 Ω | C5A 0.1 F |
| R6A 1000 Ω | C6A 10–220 pF |
| R7A 39 Ω | Q1A NE85633 |
| L1A not used | D1A 10 V |

Ω = Ohms
F = Farad
V = Volts

It should be appreciated that impedance matching networks 42 and 44 are representative networks that may be used and passive and active impedance matching networks having different types and number of components may also be used to match the transform the impedance of the antenna element 20 in a manner as discussed above.

It is anticipated that either type of matching network may be constructed on a printed circuit board with an area of about 0.5 square inches (3.23 sq. cm) and will require a connection to the antenna, a connection to the coaxial cable 30 and a ground connection, typically to the vehicle chassis. The active impedance matching network further requires a power connection which may come from a separate power connection or through the coaxial cable 30.

In the present invention, the impedance matching network is incorporated into the connector 32 for the windshield 12. To this end, in one particular embodiment of the invention, the matching network circuitry is formed on a circuit board 46 which further includes an output lead 48 that connects to the coaxial cable 30 and a ground lead 50 that is grounded to the vehicle body. The active impedance matching network further includes a lead 52 that connects the network to a power source 54, which preferably is the vehicle battery. Ground lead 50 will operate as a ground for the power source. Although not limiting in the present invention, leads 48, 50 and 52 may be wires, e.g. 20 gauge insulated copper wire, and the ends of wires may include additional connectors to connect the circuit board 46 to the proper input or output device. Although not limiting in the present invention, each wire may include a JASO pin 56 as illustrated in FIG. 2, or some other well known type of end connector. As an alternative, the ends of the leads may be incorporated into a wiring harness (not shown) to provide for a single connection of the connector 32 to the antenna system 10. To electrically couple the connector 32 to the antenna element 20 or extension 40, it is preferred that the circuit board 46 be positioned such that at least a portion of the board 46 overlays a portion of antenna element 20 or extension 40. In one particular embodiment of the invention, the circuit board 46 is a double sided board with a first surface 58 with a metallic coating on at least a portion of surface 58 and the printed circuit on its opposing surface 60. Although not limiting in the present invention, it is preferred that metallic coating on surface 58 be a solder, e.g. a tin and lead solder. The electrical components of the matching network on board 46 are positioned within area 62, as indicated in FIG. 2. The board 46 is secured within the notch 36 by an adhesive 64 applied along the surface 58. The adhesive 64 may be electrically conductive to provide a direct electrical connection between connector 32 and antenna element 20 or extension 40 or it may be electrically nonconductive so that the electrical connection is capacitive. The adhesive 64 may be applied to the surface 58 in any convenient manner, e.g. it may be sprayed on or be applied as a double sided tape. In one particular embodiment of the invention, the adhesive 64 was 0.002 inch (0.05 mm) thick CD9082 electrically conductive, double sided tape available from Specialty Tapes, Racine, Wis. In instances where there is a direct electrical connection between connector 32 and antenna element 20 or extension 40, it may be desirable to have the surface area of the circuit board 46 large enough so that in the event a conductive adhesive 64 fails electrically, the connector 32 may still maintain a capacitive connection to antenna element 20 or extension 40 that permits the continued operation of the antenna system. The surface area of the circuit board 46 of the connector 32 required for capacitive connection is based in part on the spacing between the surface 58 and the antenna element 20, i.e. the adhesive 64 thickness, and the type of materials used for the adhesive. Electrical connection between opposing surfaces 58 and 60 of board 46 may be made in any convenient manner, for example via an opening 66 which extends through the board 46 and electrically interconnects the opposing surfaces. If desired colorants may be added to the adhesive 64 to hide the connector 32 when viewed through the outer surface of the windshield 12.

Although in the particular embodiment of the invention illustrated in FIG. 2, connector 32 is positioned such that the impedance matching network is electrically coupled to the antenna element 20 by overlaying and being secured to extension 40, it is anticipated that connector 32 may be positioned such that a portion of the connector 32 overlays and/or is secured directly to surface 22 of glass ply 14. It is further contemplated that the connector 32 may be positioned entirely on surface 22 of ply 14 and an additional lead element (not shown) electrically couple the impedance matching network to antenna element 20 or extension 40.

As discussed earlier, the connector 32 is positioned within the notch 36 along edge 34 of the windshield 12. The notch 36 must be large enough to accommodate connector 32 as well as provide sufficient spacing between edge 68 of the connector 32 and edge 34 of the windshield 12 to ensure that the sealant 38 completely covers and seals connector 32 within the notch area 36 and provides a continuous moisture barrier along the windshield edge 34 and notch edge 70. The spacing between the connector edge 68 and windshield edge 34 should be at least 1 millimeter and preferably at least 3 millimeters.

It is preferred to minimize the thickness of the board 46 and the size of the circuit components. This is particularly important where the connector 32 will positioned within a notch area 36 of the windshield 12 as discussed herein. More specifically, the connector 32 should have a total thickness of no greater than about 0.12 inches (3.05 mm) which is the depth of the notch area 36. In one embodiment of the invention, it is expected that the board 46 will be approximately 0.037 inches (0.75 mm) thick and include an adhesive 64 that is about 0.002 inches (0.051 mm) thick and further that the maximum height of the network components be about 0.063 inches (1.6 mm) for a total connector thickness of approximately 0.096 inches (2.44 mm).

The notch area 36 is filled with a nonconductive sealant 38 to protect and further secure the connector 32 in place, to seal the portion of the antenna element 20 within notch area 36, and to seal the exposed edge 70 of the notch area 36 by forming a moisture barrier. In addition, it is preferred that the surface 72 of the sealant 38 along with surface 24 of the inner glass ply 16 to provide a smooth, hard uninterrupted surface along the surface 24 of inner ply 16 of the windshield 12 so as not to interfere with the windshield adhesive application and mounting system. Although not limiting in the present invention, the sealant 38 is preferably a room temperature curable material that may be injected into the notch 36 and provide a hard surface when cured, preferably a Shore A Hardness of at least about 85. Furthermore, the sealant should not adversely effect the materials forming the antenna element 20 or extension 40 in a manner that will electrically isolate the connector 32 from the antenna nor should it adversely affect the circuitry of the impedance matching network of connector 32. If desired, the network may be encased in a protective material prior to installation.

In a particular embodiment of the invention, the notch area 36 may be filled with Scotch-Weld DP-110 epoxy, available from 3M Company, St. Paul, Minn., which is a nonconductive room temperature curable, two-part epoxy. This particular sealant may be modified by adding silane, e.g. Dow Corning® Z-6040 silane available from Dow Corning, Midland, Mich., to the epoxy resin component in an amount equal to approximately 0.2 to 8 wt. % of the resin, and preferably 0.5 to 2 wt. %, to improve bonding of the sealant to the glass. In addition, carbon black, for example Arospere™ 11V carbon black available from J. M. Huber Corporation, Borger, Tex., may be added to "hide" the filled notch by providing a black appearance consistent with a black ceramic border (not shown) which is typically applied about the marginal edge portion of an automotive vehicle windshield 12. Carbon black may also be added to the accelerator component of the epoxy in an amount equal to approximately 1 to 1.5 wt. % of the accelerator. As applied, this sealant will set up in about 15 minutes so that it may be handled more easily. It should be appreciated that heating this particular epoxy sealant prior to and/or after application will reduce its cure time. When completely cured, it is expected that the epoxy will have a Shore A hardness of about 88. As an alternative to the sealant discussed above, Plastilok® 421 epoxy, which is a two-part flexible epoxy available from BF Goodrich, Adhesive Systems Division, Akron, Ohio, or W041696 T1 Black, a two-part structural adhesive available from Advanced Polymer Concepts, Germantown, Wis., may also be used to seal notch 36.

Although in the particular embodiments of the invention discussed above, the impedance matching network was mounted on a circuit board, the network components may be mounted on other types of substrates, such as but not limited to, a plastic substrate. In addition, the impedance matching network may be incorporated into an integrated circuit that is positioned and secured to the windshield 12 so that it is electrically coupled to antenna element 20 in a manner as discussed earlier with respect to the circuit board. It is further contemplated that the substrate may be eliminated and the impedance matching network components be mounted directly in the glass surface 22 and/or antenna element 20 or extension 40. The impedance matching network in such a form may be positioned within the notch area 36 and sealed in the manner discussed earlier.

It is anticipated that connector 32 with an impedance matching network as discussed above may be secured to the windshield 12 without using adhesive 64. More specifically, the connector may be soldered directly to glass surface 22 of outer ply 14 or to antenna element 20 or extension 40. It is further contemplated that the impedance matching network may secured to windshield 12 by mounting and electrically interconnecting the impedance matching network to a metal strip or connector clip of a type well known in the art and securing the strip or clip to ply 14, antenna element 20 or extension 40 in any convenient manner, e.g. solder or adhesive tape.

In fabricating the windshield 12 described above, the transparent electroconductive coating is applied to surface 24 of glass ply 14 in any manner well known in the art, using a mask to provide the desired antenna pattern. As an alternative, the entire surface 22 of ply 14 may be coated and thereafter selected portions of the coating removed to provide the desired antenna pattern. As discussed earlier, it is preferred that the edge of the coating be spaced from the edge of the glass sheet 14 to ensure that the coating is sealed within the windshield 12. It is further desirable to space the coating from the edge of sheet 14 a distance sufficient to avoid any capacitively coupling between the antenna coating and the metal frame of the vehicle which could adversely effect the performance of the antenna system. Although not limiting in the present invention, in one embodiment, the coating was spaced a minimum of about 13 mm from the edge of sheet 14. After coating, ply 14 is combined with ply 16, which includes the cut-out area corresponding to notch area 36, and the two plies are shaped simultaneously using techniques well known in the art, for example gravity sag bending. If desired, plies 14 and 16 may be shaped individually and/or prior to applying the antenna element 20. After shaping, the interlayer 18 is inserted between plies 14 and 16, with a cut out section in the interlayer 18 corresponding to the notch area 36. The entire assembly is then de-aired and laminated using techniques well known in the art to form a unitary structure. After lamination, the notch area 36 is wiped clean and connector 32 is secured to extension 40 by adhesive 64 within notch area 36. Although not limiting in the present invention, in one embodiment, the connector 32 was spaced about 15 mm from the edge 34 of sheet 14. The ends of leads 48 and 50 (and 52 for an active matching network) are then removed from the notch 36 and the notch is subsequently filled with a nonconductive sealant 38.

Although the invention as discussed above included only one electrical connection to the antenna element 20, it should be appreciated that multiple connections to the antenna element 20 of the type disclosed herein may be made along one or several edges of the windshield 12 in a manner similar to that disclosed herein.

Figure 6:
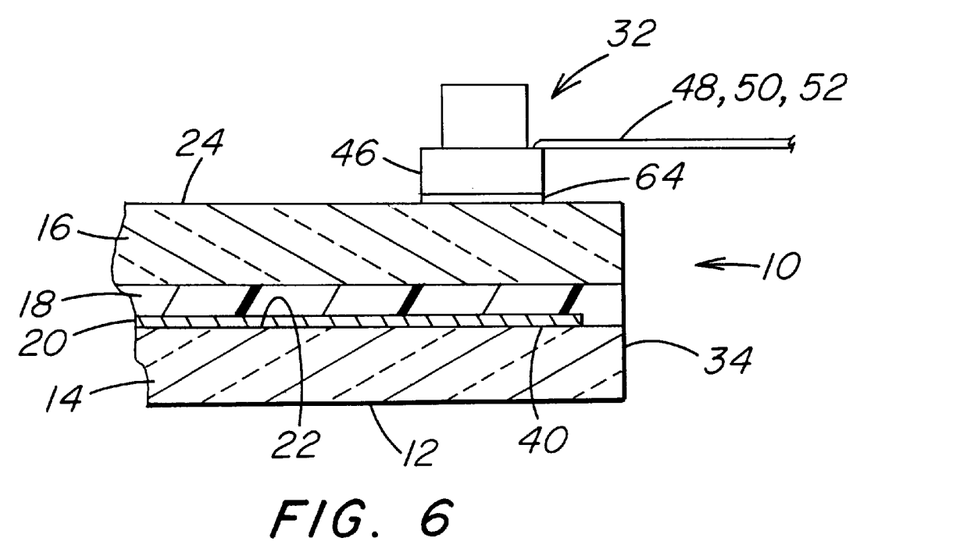
FIG. 6 is a view similar to FIG. 3 illustrating another embodiment of the present invention.

Referring to FIG. 6, it is anticipated that the impedance matching networks disclosed herein may be used to form a capacitive connection to antenna element 20 within a laminate with a connector being secured to an outer major surface of the laminate, e.g. a connector 32 secured to surface 24 of inner ply 16 of windshield 12. A problem with using a capacitive type connection in this type of arrangement is the required size of the connector. The effectiveness of the capacitive coupling depends on the size of the connector and the frequency of the signal. Relatively high frequencies, such as FM radio signals, require less area than lower frequencies, such as AM radio signals. It is anticipated that for the lower frequency AM signals, a connector positioned along surface 24 of ply 16 must overlay approximately 20 square inches (129 square centimeters) of the antenna coating 20 to provide a connection equivalent to a direct electrical connection, based on the electrical characteristics of 0.090 inch (2.23 mm) thick glass ply 16 and 0.030 inch (0.76 mm) thick polyvinyl butyral interlayer 18 and an electroconductive coating 20 of approximately 3 to 4 ohms per square. It is believed that the size of the connector 32 may be reduced to approximately 1 to 5 square inches (6.54 to 32.26 sq./cm) and the matching network incorporated into the connector 32 be used to match the impedance and boost the AM signal.

Figure 7:
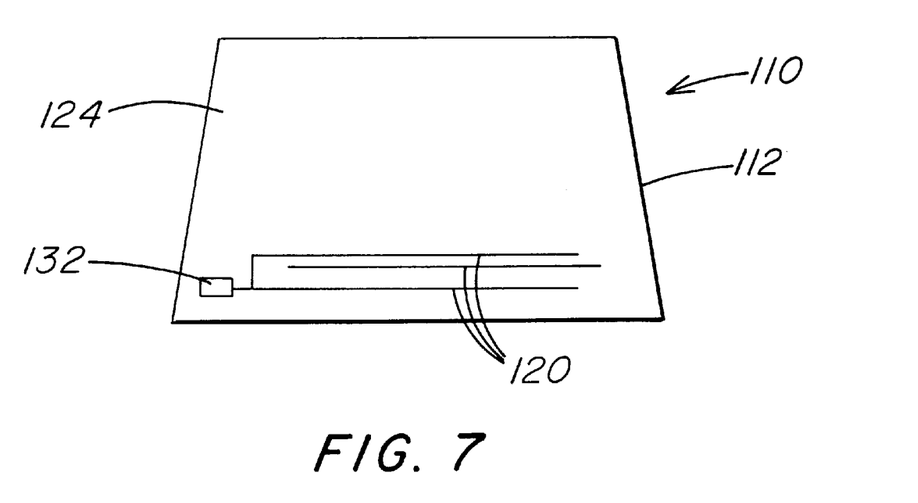
FIG. 7 is a view similar to FIG. 1 illustrating another embodiment of the present invention.

The connector as disclosed herein may also be used in combination with antenna systems wherein the antenna elements are not laminated within a transparency. More specifically, referring to FIG. 7, transparency 112 of system 110 includes antenna elements 120 secured to surface 124 of the transparency. Transparency 112 is a glass or plastic ply that may be the back or side window of a vehicle. Elements 120 may be a coating, wires and/or an electroconductive ceramic paint, as is well know in the art. Connector 132, which is similar in construction to connector 32 discussed earlier, may be secured to surface 124 such that it overlays a portion of the element 120. The connection between antenna elements 120 and connector 132 may be a direct or capacitive connection, depending on the type of adhesive used. It is anticipated that the connector 132 may require a protective coating to protect the network components along the connector's printed circuit board. It should be appreciated that if the transparency 112 further includes a heating system (not shown) of a type well known in the art, and power for the heating system is supplied through the connector 132, the impedance matching network circuitry will require additional components to isolate the AC signal from the antenna from the DC current providing power to the heating system.

Based on the disclosure herein, it is anticipated that a transparent antenna system may be manufactured in a manner such that the antenna element is incorporated into a flexible ply and the connector is secured to the flexible ply such that its impedance matching network is electrically coupled to the antenna element. If desired, this flexible antenna system may then be combined with other plies. For example, the flexible antenna may be secured to one or more rigid plies, such as glass or plastic, to form a laminate, or it may be positioned between two spaced apart glass sheets in an architectural glazing unit.

The invention described and illustrated represent a description of illustrative preferred embodiments thereof. It is understood that various changes may be made without departing from gist of the invention defined by the claims that follow.

We claim:

1. A glass antenna system comprising:
   a glass substrate;
   at least one electroconductive antenna element positioned along a major surface of said substrate, said antenna element having an impedance which varies over a given frequency band;
   a connector including:
     i) an impedance matching network that is formed on a first surface of a printed circuit board wherein an opposing second surface of said board includes an electroconductive coating, and
     ii) means to electrically interconnect said network to a feedline of an electromagnetic energy transmitting and/or receiving unit, wherein said impedance matching network transforms said impedance of said antenna element to a desired impedance; and
   adhesive to secure said connector to said glass substrate so that said board is secured to said glass substrate such that at least a portion of said second surface overlays at least a portion of said antenna element in a position such that said impedance matching network is electrically coupled to said antenna element.

2. The antenna system as in claim 1 wherein said impedance matching network is a passive impedance matching network.

3. The antenna system as in claim 1 wherein said impedance matching network is an active impedance matching network and further including means to provide power to said active impedance matching network.

4. The antenna system as in claim 1 wherein said impedance matching network is formed on a first surface of a printed circuit board and an opposing second surface of said board includes an electroconductive coating, said antenna element includes an electroconductive extension and said securing means includes means to secure said board to said glass substrate such that at least a portion of said second surface overlays at least a portion of said extension.

5. The antenna system as in claim 4 wherein said adhesive is along said second major surface of said board.

6. The antenna system as in claim 5 wherein said adhesive is an electrically conductive adhesive.

7. The antenna system as in claim 5 wherein said adhesive is a non-electrically conductive adhesive.

8. The antenna system as in claim 1 wherein said antenna element includes at least one transparent electroconductive coating.

9. The antenna system as in claim 8 wherein said glass substrate is a first glass ply and further including a second glass ply secured to said first glass ply and further wherein said antenna element is positioned between said first and second glass plies.

10. The antenna system as in claim 9 wherein said second glass ply includes a cut-out notch area along an edge of said second ply, a portion of said antenna element extends within said notch area and said connector is secured to said portion of said antenna element within said notch area.

11. The antenna system as in claim 9 wherein said impedance matching system is a passive impedance matching network.

12. The antenna system as in claim 9 wherein said impedance matching system is an active impedance matching network and further including means to provide power to said active impedance matching network.

13. The antenna system as in claim 9 wherein said impedance matching network is a first impedance matching network and said connector is a first connector secured to said first glass ply at a first position and further including at least one additional connector with an additional impedance matching network, wherein said additional connector is secured to said first glass ply at a second position on substrate such that said additional impedance matching network is electrically coupled to said antenna element.

14. The antenna system as in claim 9 wherein said impedance matching network is formed on a first surface of a printed circuit board and an opposing second surface of said board includes an electroconductive coating.

15. The antenna system as in claim 14 wherein said antenna element includes an electroconductive extension and said securing means includes means to secure said board to said first glass ply such that at least a portion of said second surface of said board overlays at least a portion of said extension.

16. A glass antenna system comprising:
   a first glass sheet;
   a second glass sheet secured to said first glass sheet to from a laminated assembly;
   a connection area along said assembly;
   at least one electroconductive antenna element positioned along a major surface of said first glass sheet such that said antenna element is positioned between said first and second sheets, said antenna element having an impedance which varies over a given frequency band;
   an electroconductive extension member extending from said antenna element to said connection area;
   a connector including an impedance matching network formed along a first major surface of a printed circuit board and an electroconductive coating along an opposing second major surface, and means to electrically interconnect said network to a feedline of an electromagnetic energy transmitting and/or receiving unit, wherein said impedance matching network transforms said impedance of said antenna element to a desired impedance;
   means to secure said connector in a position at said connection area such that said impedance matching network is electrically coupled to said antenna element.

17. The antenna system as in claim 16 wherein said connector is secured to said major surface of said first glass sheet at a position such that at least a portion of said second major surface of said connector overlays at least a portion of said extension member.

18. The antenna system as in claim 16 wherein said connector is secured to a major surface of said second glass sheet at a position such that at least a portion of said second major surface of said connector overlays at least a portion of said extension member.

19. A transparent antenna system comprising:
a transparent substrate;
at least one electroconductive antenna element positioned along a major surface of said substrate, said antenna element providing an impedance which varies over a given frequency band;
an impedance matching network adhesively secured to said substrate in a position such that said impedance matching network is electrically coupled through said adhesive to a portion of said antenna element, wherein said impedance matching network transforms said impedance of said antenna element to a desired impedance; and
means to electrically interconnect said network to a feedline of an electromagnetic energy transmitting and/or receiving unit.

20. The antenna system as in claim 19 wherein said impedance matching network is formed on a nonconductive substrate and further including means to secure said nonconductive substrate to said transparent substrate such that said impedance matching network is electrically coupled to said antenna element.

21. The antenna system as in claim 20 wherein said nonconductive substrate is a printed circuit board and said impedance matching network is formed along a first major surface of said board and an opposing major surface of said board includes an electroconductive coating.

22. The antenna system as in claim 19 wherein said impedance matching network is incorporated into an integrated circuit secured to said transparent substrate.

23. The antenna system as in claim 19 wherein said impedance matching network includes electrical components secured directly to said transparent substrate.

24. The antenna system as in claim 19 wherein said impedance matching network is electrically coupled through said electrically conductive adhesive for a direct electrical connection.

25. The antenna system as in claim 19 wherein said impedance matching network is electrically coupled through said non-electrically conductive adhesive for a capacitive connection.

26. A connector for connecting an antenna to a feedline of an electromagnetic energy transmitting and/or receiving unit, comprising:
a printed circuit board;
an impedance matching network along a first major surface of said board and electrically connected to an opposing second major surface of said board;
an electrically conductive coating along said opposing, second major surface of said board; and
means to connect said connector to said feedline of said unit.

27. The connector as in claim 26 wherein said impedance matching system is a passive impedance matching network.

28. The connector as in claim 26 wherein said impedance matching system is an active impedance matching network and further including means to provide for electrical connection of said active network to a power source.

29. The connector as in claim 26 further including an adhesive along said second major surface of said board.

30. The connector as in claim 29 wherein said adhesive is a non-electrically conductive adhesive.

31. The connector as in claim 29 wherein said adhesive is an electrically conductive adhesive.

32. The connector as in claim 26 wherein said electrical connection between opposing surfaces of the board is through an opening extending through the board and electrically interconnecting the opposing surfaces.

33. A connector for connecting an antenna to a feedline of an electromagnetic energy transmitting and/or receiving unit, comprising:
a double sided board having:
a first surface and an opposing surface and a metallic coating on at least a portion of the first surface;
an impedance matching network incorporated into an integrated circuit present on the other surface of the board; and
an electrical connection between the first and opposing surfaces of the board;
means to connect said connector to said feedline of said unit; and
means to secure said connector to an antenna element such that said impedance matching network is electrically coupled to said antenna element through coupling selected from the group of direct electrical coupling and capacitive electrical coupling through the securing means.

34. The connector of claim 33 wherein the means for securing is an adhesive selected from the group of electrically conductive adhesives and electrically nonconductive adhesives.

35. The connector of claim 33 which has a total thickness of no greater than about 0.12 inches.

36. The connector of claim 33 which includes a sealant to encase the impedance matching network.

37. A method of manufacturing a transparent antenna system comprising:
positioning at least one electroconductive antenna element that is a transparent electroconductive coating along a major surface of a rigid, transparent substrate of a first ply selected from the group consisting of glass and plastic, wherein said antenna element provides an impedance which varies over a given frequency band;
securing a second ply selected from glass and plastic to said first glass ply such that said antenna element is positioned between said first and second plies;
adhesively securing an impedance matching network to said substrate in a position such that said impedance matching network is electrically coupled to a portion of said antenna element, wherein said impedance matching network transforms said impedance of said antenna element to a desired impedance; and
electrically interconnecting said network to a feedline of an electromagnetic energy transmitting and/or receiving unit.

38. The method as in claim 37 further including the steps of forming a cut-out notch area along an edge of said second ply, extending a portion of said antenna element within said notch area and securing said impedance matching network to said portion of said antenna element within said notch area.

39. A glass antenna system comprising:
a glass substrate;
at least one electroconductive antenna element including at least one transparent electroconductive coating positioned along a major surface of said substrate, said antenna element having an impedance which varies over a given frequency band;

a connector including an impedance matching network and means to electrically interconnect said network to a feedline of an electromagnetic energy transmitting and/or receiving unit, wherein said impedance matching network is formed on a first surface of a printed circuit board and an opposing second surface of said board includes an electroconductive coating, and said securing means includes means to secure said board to said glass substrate such that at least a portion of said second surface overlays at least a portion of said antenna element to transform said impedance of said antenna element to a desired impedance; and means to secure said connector to said glass substrate in a position such that said impedance matching network is electrically coupled to said antenna element.

* * * * *